(12) United States Patent
Berard et al.

(10) Patent No.: US 9,612,386 B2
(45) Date of Patent: Apr. 4, 2017

(54) LUMINOUS GLAZING UNIT WITH OPTICAL ISOLATOR

(71) Applicant: SAINT-GOBAIN GLASS FRANCE, Courbevoie (FR)

(72) Inventors: Matthieu Berard, Paris (FR); Pierrick Guiset, Massy (FR); Maud Sarrant-Foresti, Paris (FR); Charles Leyder, Paris (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 15/117,523

(22) PCT Filed: Feb. 9, 2015

(86) PCT No.: PCT/FR2015/050301
§ 371 (c)(1),
(2) Date: Aug. 9, 2016

(87) PCT Pub. No.: WO2015/118279
PCT Pub. Date: Aug. 13, 2015

(65) Prior Publication Data
US 2016/0349442 A1 Dec. 1, 2016

(30) Foreign Application Priority Data
Feb. 10, 2014 (FR) .................................... 14 50997

(51) Int. Cl.
*F21V 8/00* (2006.01)
*B32B 17/10* (2006.01)

(52) U.S. Cl.
CPC ...... *G02B 6/0043* (2013.01); *B32B 17/10036* (2013.01); *B32B 17/10541* (2013.01);
(Continued)

(58) Field of Classification Search
CPC .... G02B 6/0043; G02B 6/005; G02B 6/0076; G02B 6/0095; B32B 17/10036;
(Continued)

(56) References Cited

FOREIGN PATENT DOCUMENTS

| EP | 0 823 653 A1 | 2/1998 |
|----|--------------|--------|
| EP | 0 825 478 A1 | 2/1998 |

(Continued)

OTHER PUBLICATIONS

Translation of EP 20423173; google.com; Nov. 11, 2016, pp. 1-26.*
(Continued)

*Primary Examiner* — Lauro Tso
(74) *Attorney, Agent, or Firm* — Pillsbury Winthrop Shaw Pittman LLP

(57) ABSTRACT

A luminous glazing unit includes a glass substrate, an additional element that is tinted an optical isolator between the glass substrate and the additional element, a light source, optically coupled to the glass substrate, and a light-extracting device associated with the glass substrate. The optical isolator includes a low-index film, made of fluoropolymer-based material which: has a refractive index n2 at 550 nm such that n1-n2 is at least 0.08, has a thickness e2 of at least 600 nm, is in optical contact with the first main face by a first lamination interlayer, based on a thermoplastic material.

22 Claims, 5 Drawing Sheets

(52) U.S. Cl.
CPC .. *B32B 17/10761* (2013.01); *B32B 17/10788* (2013.01); *G02B 6/005* (2013.01); *G02B 6/0076* (2013.01); *G02B 6/0095* (2013.01); *B32B 2307/416* (2013.01); *B32B 2307/418* (2013.01); *B32B 2307/422* (2013.01)

(58) Field of Classification Search
CPC ........ B32B 17/10541; B32B 17/10761; B32B 17/10788; B32B 2307/416; B32B 2307/418; B32B 2307/422
USPC .................................................. 362/606, 627
See application file for complete search history.

(56) References Cited

FOREIGN PATENT DOCUMENTS

| | | |
|---|---|---|
| EP | 0 964 288 A2 | 12/1999 |
| EP | 2 423 173 A1 | 2/2012 |
| FR | 2 694 069 A1 | 1/1994 |
| FR | 2 987 043 A1 | 8/2013 |
| FR | 2 989 176 A1 | 10/2013 |
| WO | WO 01/90787 A1 | 11/2001 |
| WO | WO 03/007060 A1 | 1/2003 |
| WO | WO 2004/030935 A2 | 4/2004 |
| WO | WO 2005/018283 A1 | 2/2005 |
| WO | WO 2007/077099 A1 | 7/2007 |
| WO | WO 2008/059170 A2 | 5/2008 |
| WO | WO 2008/059171 A2 | 5/2008 |
| WO | WO 2009/081077 A2 | 7/2009 |
| WO | WO 2012/035258 A1 | 3/2012 |
| WO | WO 2012/098330 A1 | 7/2012 |
| WO | WO 2012/172269 A1 | 12/2012 |

OTHER PUBLICATIONS

Translation of EP 0653038; google.com; Nov. 11, 2016, pp. 1-12.*
International Search Report as issued in International Patent Application No. PCT/FR2015/050301, dated May 15, 2015.
International Preliminary Report on Patentability and the Written Opinion of the International Searching Authority as issued in International Patent Application No. PCT/FR2015/050301, dated Aug. 16, 2016.

* cited by examiner

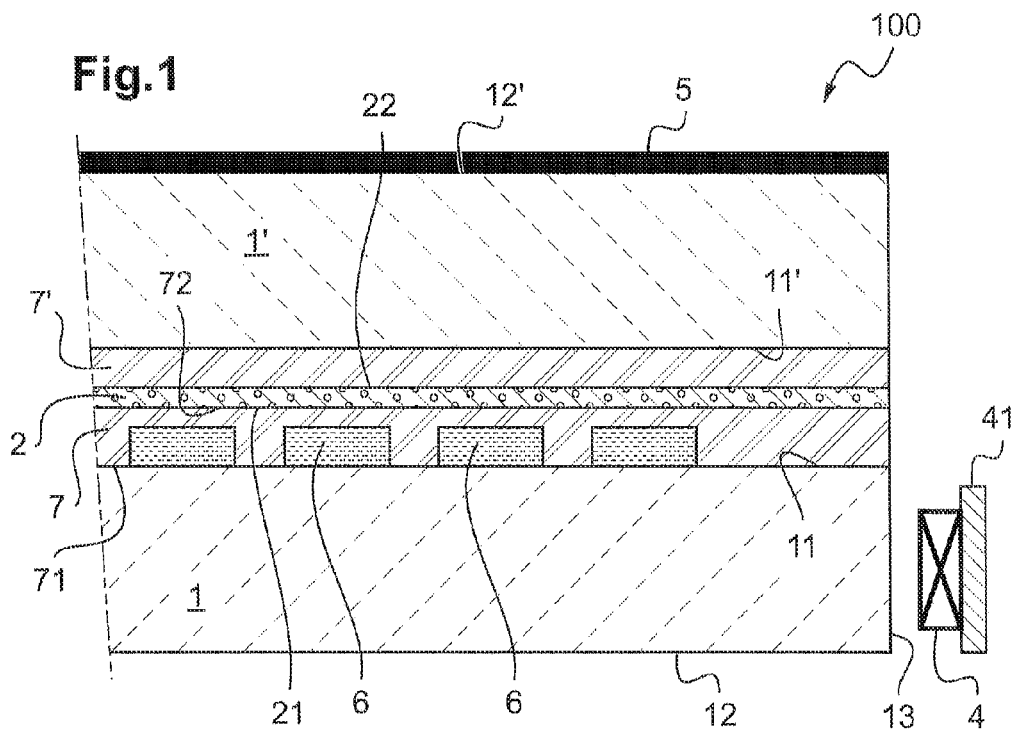
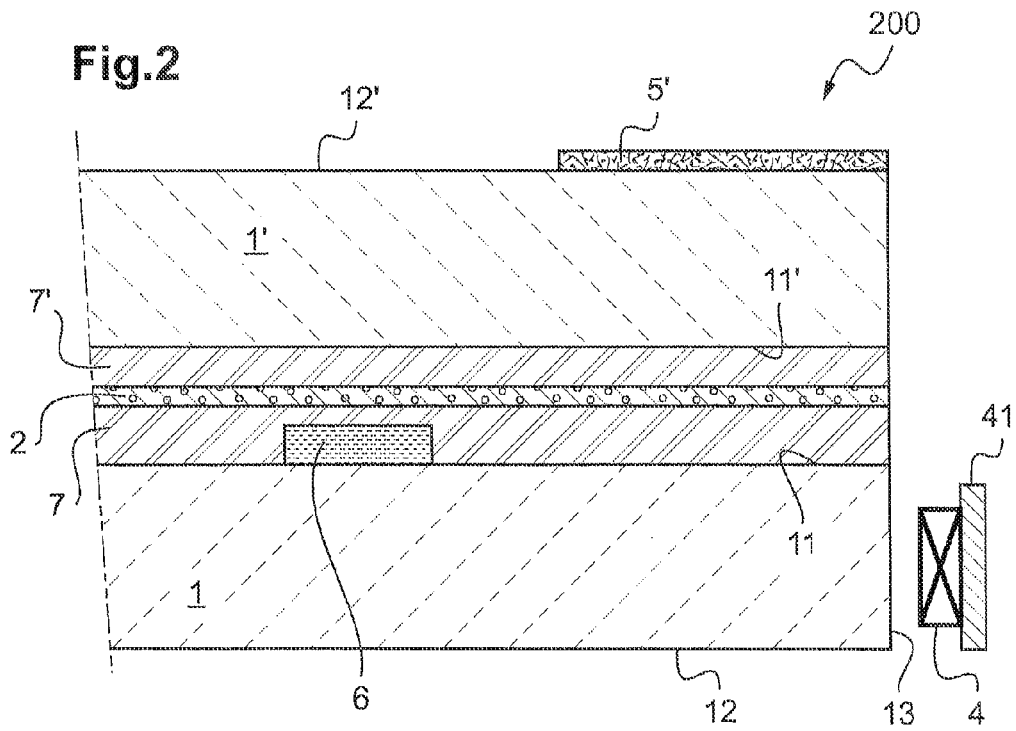

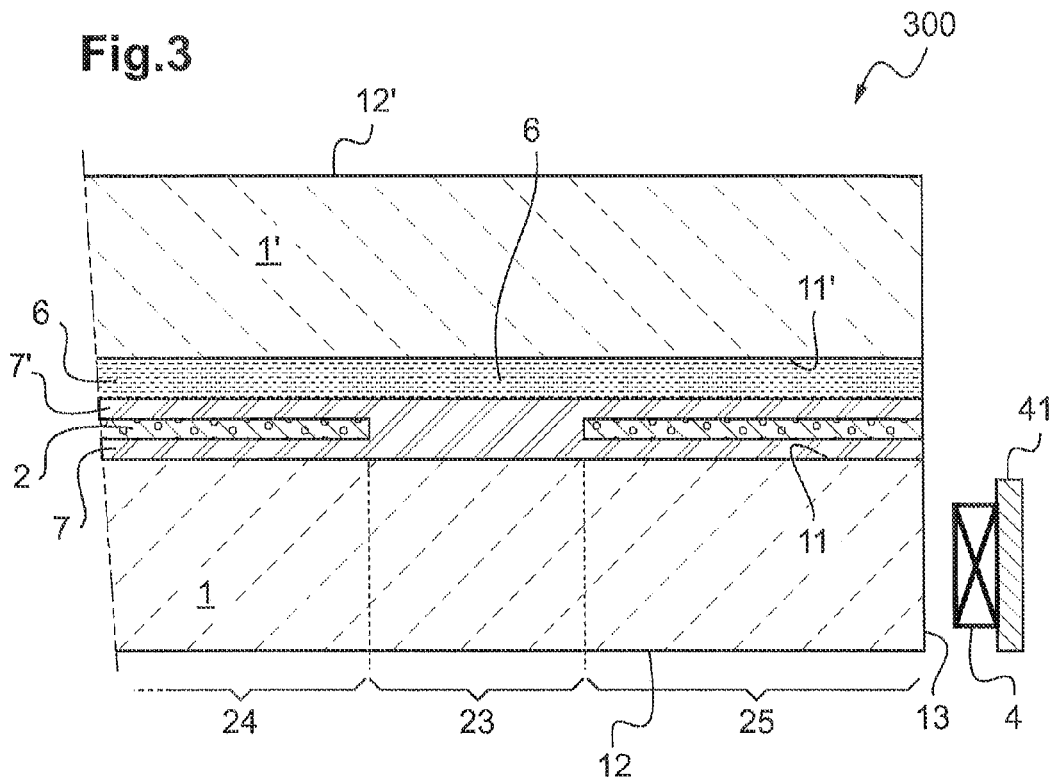
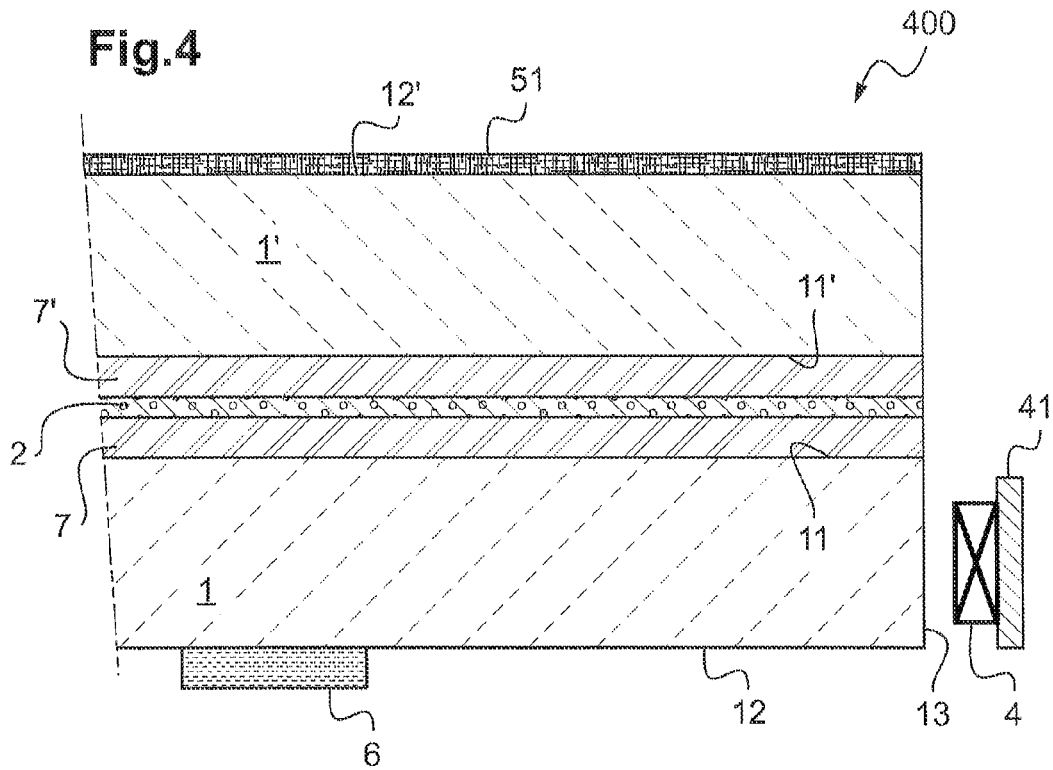

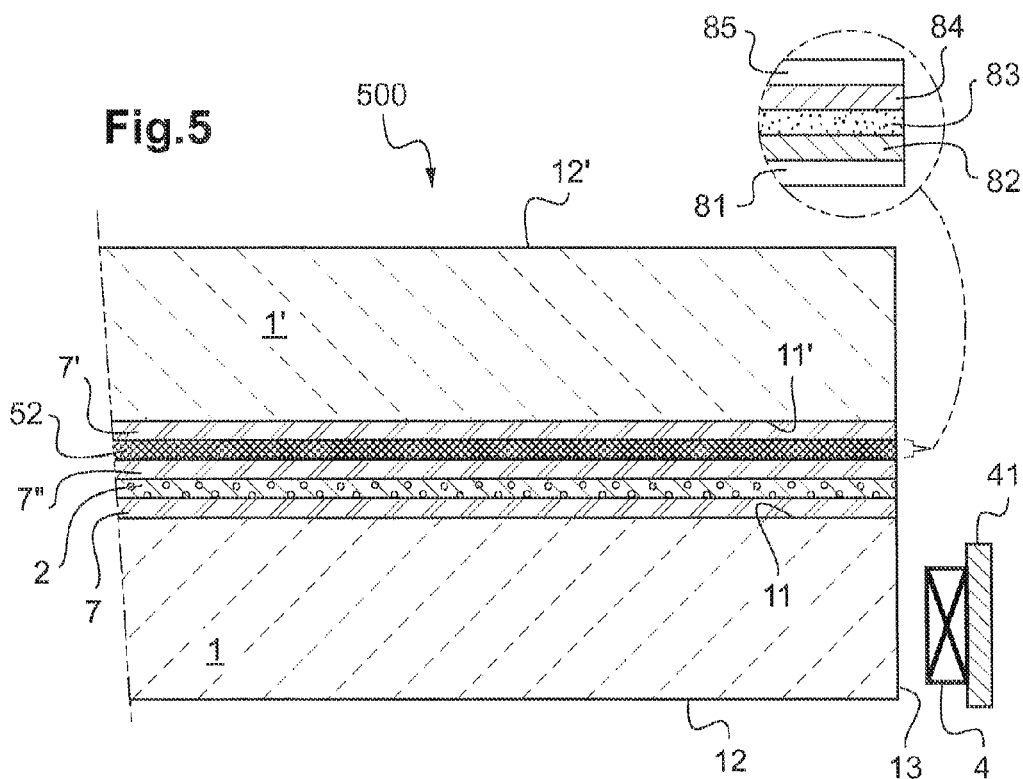
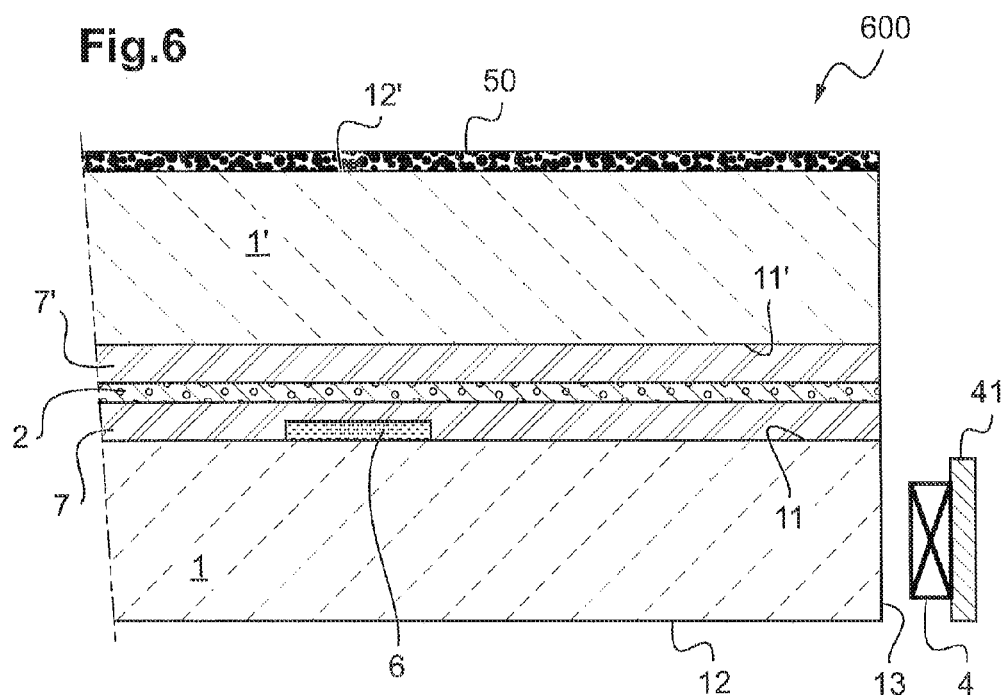

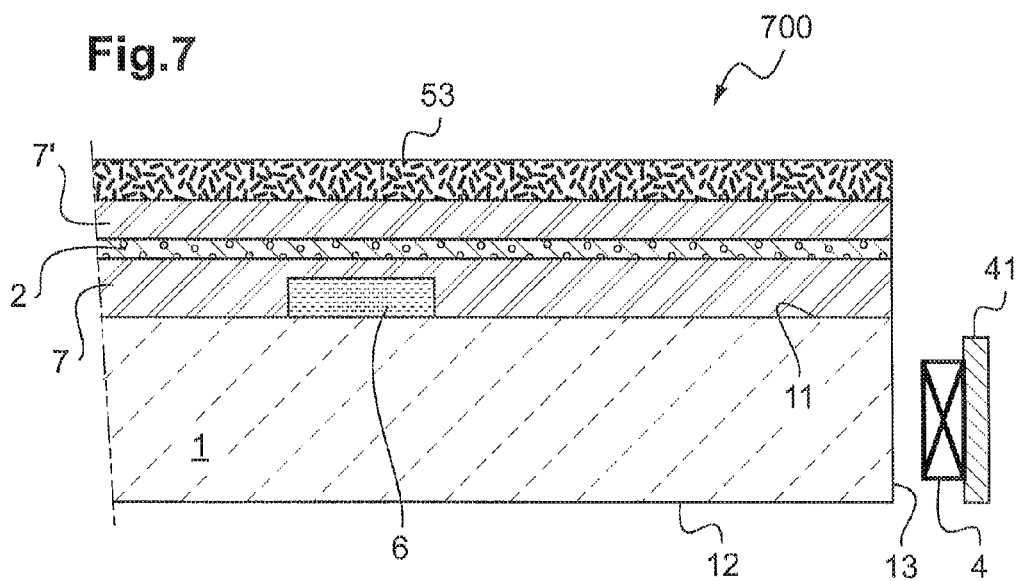
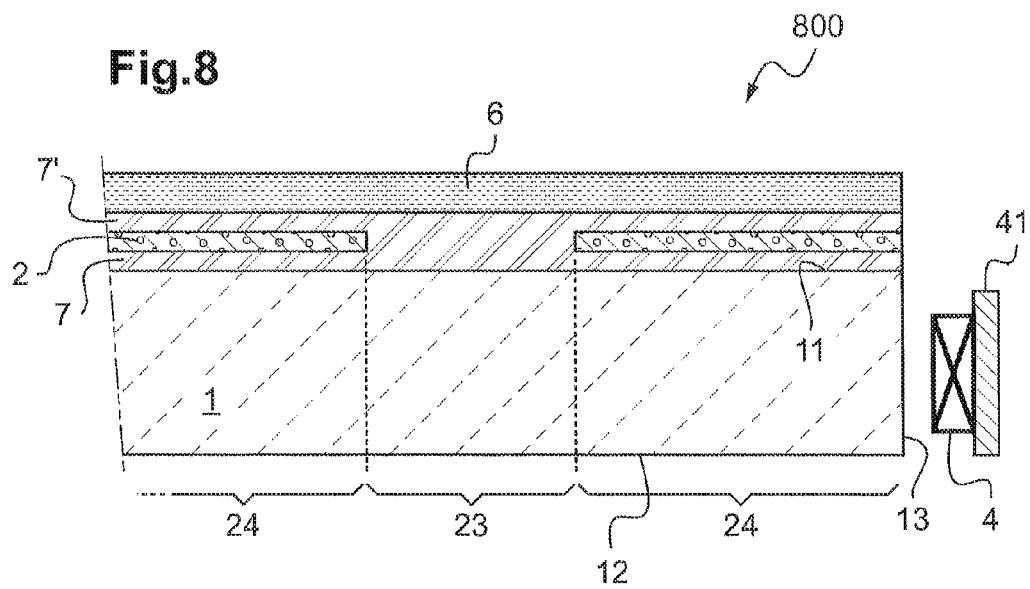

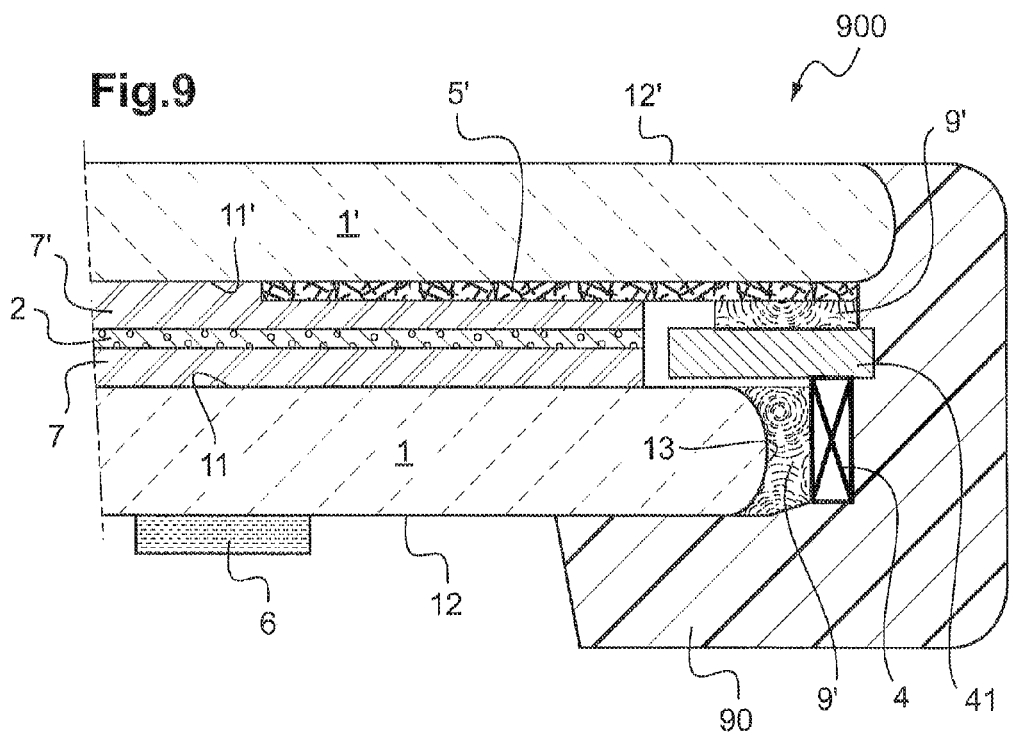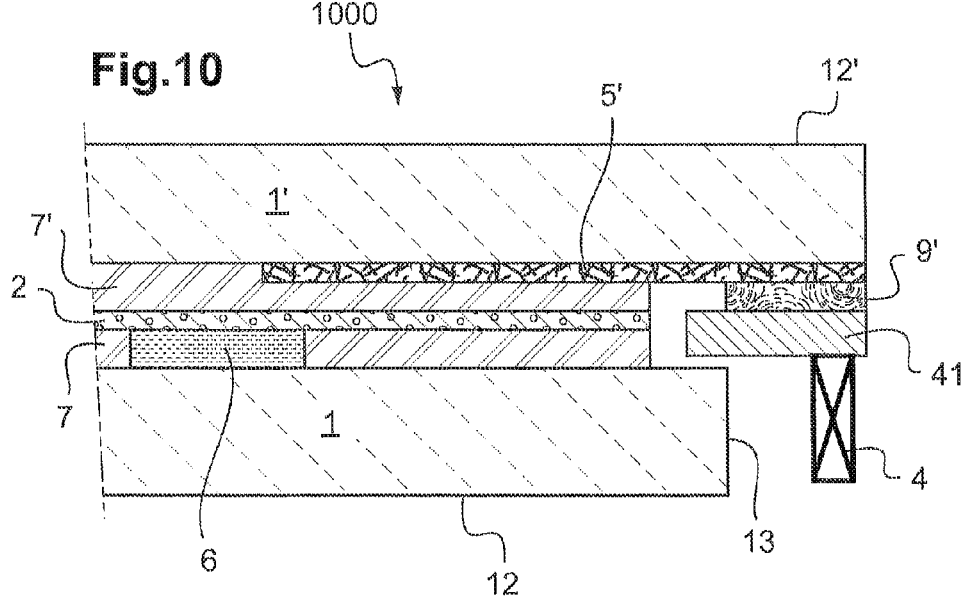

LUMINOUS GLAZING UNIT WITH OPTICAL ISOLATOR

CROSS-REFERENCE TO RELATED APPLICATIONS

This application is the U.S. National Stage of PCT/FR2015/050301, filed Feb. 9, 2015, which in turn claims priority to French Application No. 1450997, filed Feb. 10, 2014. The contents of all of these applications are incorporated herein by reference in their entirety.

The present invention relates to the field of lighting and more particularly relates to a luminous glazing unit having diodes arranged on the edge face of the glazing unit.

It is known to form a luminous glazing unit by illuminating a glass pane via the edge face with a light source such as an array of LEDs. The light thus injected is guided by total internal reflection inside this glass pane by virtue of the contrast in refractive index with the surrounding materials. This light is then extracted with the aid of scattering means.

Document WO 2008/059171 proposes, in connection with FIG. 5, an edge-lit luminous panel comprising a flat guide, which is for example a 2 mm thick clear glass panel, the edge face of which is coupled to a light source, an array of LEDs, optionally in a groove of the edge face, and comprising on a first main face 11:
- a discontinuous porous layer, having a thickness of the order of 300 nm and an index n2 equal to 1.1, which is a porous silica sol-gel layer,
- a scattering layer on the porous silica layer and entirely covering the first face.

When the light source is not lit, the panel has a uniform and scattering white appearance and is used for example as a partition, to preserve privacy (privacy effect). When the light source is lit, zones without a porous silica layer, for example decorative bands and/or those forming a signage element, a logo, a trademark, etc., are perceived by contrast.

In one variant, for example for wall tiling, the low-index porous silica layer is continuous, the scattering layer is opaque, for example a lacquer, the flat guide is a 6 mm thick glass tile and a scattering grating is added to the outer face of the tile.

This porous layer, owing to its low density, having an optical index substantially lower than that of the glass pane, makes it possible to optically isolate the glass pane from the lacquer.

Document WO 2008/059170 itself proposes to use a porous low-index layer as an optical isolator in a diode-lit laminated glazing unit. This layer optically isolates the first glass substrate from the tinted second glass substrate. FIG. 11 thus proposes a motor vehicle luminous roof with, as porous layer, a porous silica sol-gel layer.

Document WO 2007/077099 lastly proposes, in its FIG. 3, a luminous roof, incorporating the following sequence: guiding glass pane/transparent optical adhesive/PVB/functional layer/PVB/glass pane. This acrylic-based optical adhesive having a refractive index of the order of 1.4740 is on the extra-clear guiding glass pane having a refractive index of 1.52. This optical adhesive certainly has a lower index than the glass but the difference in refractive index is ~0.046, which still remains too low. Furthermore, an optical coupler at the edge face of the guiding glass pane is necessary for the angle of incidence to be greater than the critical angle.

The invention proposes a luminous glazing unit that is more robust than that from the prior art without adversely affecting its light extraction efficiency performance or complicating its design. In particular it is desired to control the light extraction even better at one or more well-defined points that are for example well distributed over the surface of the glass pane.

For this purpose, the invention proposes a luminous glazing unit comprising:
- a first (transparent, clear, extra-clear) glass substrate, made of mineral glass having a refractive index n1 of less than 1.6 at 550 nm (better still in the whole of the visible spectrum), and even less than 1.55, preferably from 1.5 to 1.53, with first and second main faces and an edge face, and, in optical contact with the first main face:
  - an additional (decorative and/or functional) element that is tinted (and/)or scattering (and/)or reflective (mirror, two-way mirror);
  - an optical isolator inserted between the first glass substrate and the additional element, the optical isolator having a refractive index of less than n1 at 550 nm,
- a (visible) light source, preferably an array of (aligned) light-emitting diodes, on a carrier, such as a printed circuit board referred to as a PCB carrier, or an extracting optical fiber, optically coupled to the first glass substrate, preferably via the edge face, referred to as the coupling edge face, or as a variant optically coupled to one of the main faces (in particular with a housing for the diodes), the first glass substrate, referred to as guiding glass pane, guiding the light emitted by the source,
  - preferably light-extracting means (for extracting light resulting from the guidance) associated with the guiding glass pane (optionally sold separately or in a luminous glazing unit in kit form and/or added by the user), in particular scattering means on the side of the first main face (on or better still under a first lamination interlayer) and/or on the side of (even preferably on) the second main face and/or in the bulk of the guiding glass pane, optionally forming a light concentrator.

And the optical isolator according to the invention comprises (better still consists of) a film based on a fluoropolymer, better still made of a fluoropolymer:
- having a refractive index n2 such that n1-n2 is at least 0.08 at 550 nm (better still in the whole of the visible spectrum),
- having a thickness e2 of at least 600 nm, better still of micron-size and even of at least 10 μm,
- in optical contact with the first main face by means of a first lamination interlayer based on a (transparent, clear, extra-clear) thermoplastic material, in particular having a thickness of at most 1.3 mm or even of submillimeter size, having a refractive index n3 at 550 nm such that n3-n1 (as an absolute value) is less than 0.05 (better still in the whole of the visible spectrum) and even less than 0.03, n3 optionally being less than n1.

This low-index fluoropolymer film enables simple implementation, design flexibility (by simple cutting of the film) for any size (large surface area included), and above all a better durability than a low-index porous layer which has a tendency to lose its porosity over time.

The lamination interlayer, due to its transparency and its uniform adhesion to the guiding glass pane, provides a mechanical strength of the film that is essential for satisfactory optical contact.

In the final product, it is preferable to distinguish between the low-index fluoropolymer film (assembled via the first interlayer) and a fluoropolymer layer or deposit deposited by wet processing. A fluoropolymer layer requires the use of special solvents and getting it to adhere may be very problematic.

For the lamination, a conventional thermal cycle may be used and even more preferably that used for the laminated glazing unit employing plastic films (polyethylene terephthalate (PET) etc.).

In addition, n1-n2 may be at least greater than 0.1, even greater than 0.15, more preferably still greater than or equal to 0.2. Preferably, n2 may be less than or equal to 1.45 or even less than or equal to 1.4.

The low-index film makes it possible to guide light that is slightly more divergent than in the absence thereof. The refractive index n2 may easily be ~1.4, or even ~1.34.

By way of illustration, with an n1-n2 equal to 0.1, an angular acceptance of ±35° is obtained with respect to the input face of the film (in air) which, with a Lambertian diode, corresponds to ~50% extra guided light with respect to an acceptance of ±22° for n1-n2 equal to 0.046.

The optical isolator preferably consists of the low-index film.

In the absence of an optical isolator, the optical losses are particularly significant when a tinted additional element has a $T_L$ of less than 85% in particular for a (reference) thickness of 4 mm or even 2 mm. $T_L$ is measured in a conventional manner according to the EN410 standard with a D65 illuminant and a spectrophotometer.

Even a reflective element, in particular a specular element, in particular a silvered mirror or a two-way mirror, may advantageously be optically isolated for better guidance. Examples of layers that form a two-way mirror are described in patent WO 2012/035258.

Preferably, the guiding glass pane and first lamination interlayer assembly has a $T_L$ of greater than 85% and even of at least 90% in particular for a glass thickness of 4 mm or even 2 mm.

For the sake of simplicity, the low-index film extends over all of the first lamination interlayer that itself extends over substantially all of the guiding glass pane though it is possibly set back from the coupling edge face of the guiding glass pane.

The fluoropolymer film may be based on or even made of one of the following materials:
  perfluoroalkoxy (PFA), especially of n2 of about 1.3;
  polyvinylidene fluoride (PVDF), especially of n2 of about 1.4;
  ethylene chlorotrifluoroethylene (ECTFE);
  ethylene tetrafluoroethylene (ETFE), more precisely poly (ethylene-co-tetrafluoroethylene), especially of n2 of about 1.4;
  fluorinated ethylene propylene (FEP), especially of n2 of about 1.3; and
  polytetrafluoroethylene (PTFE), especially of n2 of about 1.3, but which is the most difficult to laminate.

ETFE is preferred because it is the easiest to laminate to the thermoplastic first lamination interlayer. FEP may be preferred for its low refractive index or lower haze as it provides an acceptable lamination performance.

The haze of the (ETFE, FEP) film is for example at most 2°. Mention may be made of the product named Norton ETFE from Saint Gobain Performance Plastics having a haze of between 1.5% and 2% and a refractive index equal to 1.4, or Norton FEP from Saint Gobain Performance Plastics having a haze of between 1.5% and 2% and a refractive index equal to 1.34.

The haze is measured with a hazemeter, preferably according to the ASTM D 1003 standard.

Polysiloxanes are other low-index materials, but their mechanical properties are unsatisfactory.

As first lamination interlayer, it is possible to select in particular a sheet of thermoplastic material made of ethylene/vinyl acetate (EVA) or else made of polyurethane (PU) or made of polyvinyl butyral (PVB). Such a sheet is preferably made of a multi- or single-component resin that is either heat-curable (epoxy, PU) or UV-curable (epoxy, acrylic resin) for the application of the low-index film.

The first lamination interlayer is preferably of submillimeter size, its thickness not influencing the lamination quality of the low-index film. For each EVA or PVB, a thickness of less than 0.5 mm, in particular 0.4 mm approximately (one sheet), is preferred in order to reduce the haze. The haze of the first lamination interlayer is for example at most 2° and even at most 1.5°. Mention may be made of EVASafe039 from Bridgestone. Mention may be made of the PVB RB41 having a haze of less than 1.5% sold by Solutia.

The luminous glazing unit may comprise a (central or peripheral) transparent zone, without extraction or additional element, in the transparent zone the haze of the luminous glazing unit is preferably at most 2.5°. Preferably the $T_L$ in the transparent zone is at least 85% and even at least 88%.

The first lamination interlayer may be clear, extra-clear or even neutral in color.

Advantageously, in particular for a building application, the first lamination interlayer comprises EVA in contact with the low-index film since the Applicant observed in that case a better adhesion of the low-index film with EVA.

e2 is at least 600 nm for better guidance. A fluoropolymer film is readily available above 50 μm.

For better assembly to the guiding glass pane, the low-index film may have a first main surface facing the inner face and in contact with the first lamination interlayer and a second main surface facing the second main face, referred to as the outer face, the first main surface is treated by adhesion-promoting surface treatment, preferably a corona treatment.

The second main surface may also preferably be treated by adhesion-promoting surface treatment, preferably a corona treatment, for better adhesion with the functional or decorative additional element or any other inserted element.

In a first advantageous embodiment:
  a second polymeric lamination interlayer in adhesive contact with the second main surface, which is preferably treated by an adhesion promoter, in particular by corona treatment, optionally bulk-tinted, preferably based on thermoplastic material identical to the first lamination interlayer, in particular made of EVA (in particular for a building application);
  a second glass substrate, made of mineral glass or organic glass, bonded to the second lamination interlayer via a face referred to as a bonding face (generally in adhesive contact unless another element is inserted);
  the second interlayer and/or the second glass substrate forming the additional element or bearing the additional element.

As second lamination interlayer, it is possible to select in particular a sheet of thermoplastic material made of ethylene/vinyl acetate (EVA), made of polyurethane (PU) or made of polyvinyl butyral (PVB). Such a sheet is preferably made of a multi- or single-component resin that is either heat-curable (epoxy, PU) or UV-curable (epoxy, acrylic resin) for covering the low-index film.

Mention may be made of the products named Saflex® from Solutia, which are tinted or clear or extra-clear.

Preferably, the nature and the thickness of the second lamination interlayer are identical to the nature and the thickness of the first lamination interlayer, in particular made of EVA (in particular for a building application).

In this first embodiment, in particular for a vehicle application (roof in particular), the first lamination interlayer comprises a first sheet of PVB in adhesive contact with the inner face and a first sheet of EVA which is in adhesive contact with the low-index film (via its first main surface) and the second lamination interlayer comprises a second sheet of PVB in adhesive contact with the bonding face and a second sheet of EVA which is in adhesive contact with the low-index film (via its second main surface).

Preferably, for a vehicle glazing unit, the guiding glass pane has a thickness of less than 3 mm. The second glass substrate, in particular made of mineral glass, has a thickness of less than 3 mm, this thickness in particular being identical.

Preferably, for a building glazing unit, the guiding glass pane has a thickness of from 4 to 6.5 mm, the second glass substrate, made of mineral glass, has a thickness of from 4 to 6.5 mm, these two thicknesses in particular being identical.

Between the guiding glass pane and the second glass, in particular mineral glass, substrate, said second lamination interlayer may be:
 transparent, in particular clear or extra-clear,
 or scattering (in its volume rather than surface texturing) or may bear a scattering layer, for example an ink, a printed layer, for example that is local, and that is part of or forms the extracting means if the optical isolator (the low-index film) is discontinuous.

The second (flexible, rigid or semi-rigid) glass substrate made of mineral glass may be clear, extra-clear or even scattering or may bear a scattering element (deposit, added film) for example on the other side of its bonding face with the second interlayer.

For a vehicle glazing unit, in particular a glazed roof, the second lamination interlayer is tinted and/or the second glass substrate, preferably made of mineral glass, is tinted and best of all the second lamination interlayer and the second glass substrate are both tinted. The thickness of the glass substrates, preferably made of mineral glass, is preferably at most 3 mm. A table 1 hereinbelow gives examples of glass sold by the Applicant. They are suitable for all the glazing units of a vehicle, whether they are tempered or laminated. The SGS THERMOCONTROL® Absorbing/Venus glass improves the thermal comfort by absorbing the energy load in the bulk of the glass. These types of glass are divided into two categories: "Vision" (light transmission >70%) and "Privacy" (light transmission <70%).

TABLE 1

| Type of glass | $T_L$ (%) | $T_E$ (%) | Eff (%) |
|---|---|---|---|
| SGS THERMOCONTROL ® Venus Green 55 | 49 | 27 | 7 |
| Green-tinted high-performance//Clear glass | 28 | 16 | 3 |
| SGS THERMOCONTROL ® Venus Green 35 | 35 | 22 | 5 |
| SGS THERMOCONTROL ® Venus Grey 10 | 10 | 8 | 1 |
| SGS THERMOCONTROL ® Absorbing TSA3+ | 71 | 44 | 18 |
| Standard green glass | 78 | 53 | 25 |

The "Vision" glass is suitable for all types of glazing in the vehicle: green/blue/gray and ensures a reduced energy transmission ($T_E$). The most popular color for this purpose is green. It has been chosen due to its neutral appearance which does not affect the harmony of the colors of a vehicle.

The "Privacy" glass is glazing that is bulk-tinted for thermal comfort and privacy. It is glazing that is supertinted dark green or dark gray. In order to ensure privacy, this glazing has light transmission values that are below 70%, generally around 55% or less. Due to its dark tint, this type of glass also ensures a low UV transmission (UV rays may cause skin irritation).

In most countries, Venus/Privacy glass is suitable for the rear side windows (after the B-pillar), rear window and roof. The only exception is the United States, where supertinted glazing is prohibited on light vehicles (except sunroof) and, consequently, they are only used on utility vehicles (after the B-pillar). The application to sunroofs is accepted worldwide, irrespective of the type of vehicle.

Current European legislation requires for example a minimum light transmission of 75% for windshields and of 70% for the front doors.

SGS THERMOCONTROL® Venus consists of dark gray or dark green supertinted glazing. It has all the thermal advantages of "Vision" (SGS THERMOCONTROL® Type) glass with improved solar protection:
 lower energy transmission values (compared to all other glass solutions),
 its dark color also blocks UV radiation, which is responsible for skin irritation and discoloration of the passenger compartment,
 offers greater privacy for the vehicle's passengers (it is difficult to see through the glass from the outside).

The second glass substrate (laminated by the second interlayer) may also be made of organic glass, in particular that is flexible, such as:
 a poly(ethylene terephthalate) (PET) preferably laminated with PVB or EVA, functional (tinted, scattering) PET,
 or a polyester optionally with a "hard" layer such as a siloxane,
 or else a thermosetting PU laminated with a second thermoplastic PU interlayer as described in document EP 132 198.

The second glass substrate may also be made of (rigid or semi-rigid) organic glass such as a polymethyl methacrylate (PMMA)—preferably with a PU lamination interlayer—or a polycarbonate (PC)—preferably with a PVB lamination interlayer.

The face opposite the first (where appropriate lamination) face or the bonding face may be free, or at least accessible and/or be used for the assembly.

In this first laminated glazing unit embodiment, the bonding face of the second substrate, preferably made of mineral glass, may be coated with a decorative and/or masking layer, in particular an enamel and/or a paint (lacquer) or a reflective layer which is peripheral and on the side of the optical coupling (frame), or distributed and even substantially covering the bonding face.

And/or the face opposite the bonding face of the second substrate, preferably made of mineral glass, may be coated with a decorative and/or masking layer in particular an enamel and/or a paint (lacquer) or a reflective layer, which is peripheral and on the side of the optical coupling (frame), or distributed and even substantially covering the face opposite the bonding face.

Underneath the paint (lacquer) there may be a preferably transparent adhesion primer.

Alternatively, it is possible to have the following sequence: guiding glass pane/first lamination interlayer/low-index film/second lamination interlayer (PVB) with decorative paint or ink/second (transparent, tinted) glass substrate.

A laminated lacquered glazing unit with an optional adhesion primer sublayer is described in document WO 2009/081 077. In order to optimize the adhesion between the paint and an optional polymer lamination interlayer sheet, the paint is preferably subjected to the action of a plasma, in particular via a corona discharge treatment, before heat treatment. For the same purpose, it is also possible to deposit silanes on the paint, for example by spraying or wiping. These treatments make it possible to use paints, especially lacquers, the adhesion of which with the polymer interlayer sheets is naturally weak. Nevertheless, they generate an additional cost and are not therefore preferred.

The transparency of the low-index film may make it possible in particular to preserve the view through the luminous glazing unit or else the tint conferred by the tinted additional element.

The transparency of the low-index film makes it possible in particular to preserve the view of a decorative element, for example a paint (in particular a lacquer) in particular on the second glass substrate (and/or of an enamel on the second glass substrate), enamel or paint (lacquer) distributed over a surface of the second glass substrate (bonding face or opposite face), substantially covering this surface or as discrete features or else as a border (lateral and/or longitudinal bands, frame).

The transparency is taken here in the broad sense, implying vision through, it being possible for the low-index film to be colorless or tinted, of neutral color or bright color. The low-index film may even be adjusted as a function of the tint of the tinted additional element, in particular second isolated glass substrate and/or of the second lamination interlayer which is itself tinted for additional color. The low-index film may for example be adjusted as a function of the color of the paint and/or of the enamel used for decorative purposes, for additional color.

The paint or the enamel is generally opaque but may alternatively let more light pass through for example when applied as a thin layer and/or by adjusting the content of fillers in the binder.

The low-index film may be tinted by nature (of the matrix) and/or for example by addition of coloring additives.

For simplicity, a colorless low-index film may be preferred.

In this first embodiment, the bonding face of the second substrate, preferably made of mineral glass, or the opposite face may comprise a scattering layer (deposition, element, in particular plastic element, added in particular adhesively bonded with an optical adhesive) and/or said second substrate is scattering and/or else a scattering element is between the low-index film and the second lamination interlayer.

It is possible to have the following sequence: first lamination interlayer/low-index film/second lamination interlayer (PVB) with scattering paint or ink/second (transparent or tinted) glass substrate.

In another embodiment, the first glass substrate made of mineral glass is replaced by a first organic, preferably PMMA or PC, glass substrate and preferably the luminous glazing unit additionally comprises:

a second polymeric lamination interlayer in adhesive contact with the second main surface, preferably treated by an adhesion promoter, in particular by corona treatment, a second glass substrate, preferably made of mineral glass or even made of organic glass, bonded to the second lamination interlayer via a face referred to as a bonding face, the second interlayer and/or the second glass substrate forming the additional element or bearing the additional element.

Furthermore, the low-index film (on top of the interlayer) according to the invention may be continuous, occupying substantially entirely the inner face (to within a margination in particular).

Preferably, the first lamination interlayer and the low-index film are set back from the edge face, referred to as the coupling edge face, of the guiding glass pane, leaving a free peripheral zone (or band). The guidance in this zone is the highest possible but large-angle rays may all the same be extracted forming hot spots if the second face is visible (no mounting profiles of the glazing unit etc.). Therefore in addition, the (preferably opaque) light source carrier (in particular a printed circuit board, PCB, which is a diode carrier), and/or a profile bearing the PCB carrier, may be arranged facing this peripheral zone and preferably is not in optical contact with the guiding glass pane. The PCB carrier (and/or the preferably metallic bearing profile) serves as a screen.

Preferably, the first lamination interlayer, the low-index film and the second lamination interlayer are set back from the edge face, referred to as the coupling edge face, of the guiding glass pane, in a groove between the first face and the bonding face of the second, preferably mineral, glass substrate. The guidance in this zone is the highest possible but large-angle rays may all the same be extracted forming hot spots. Therefore in addition, the (preferably opaque) light source carrier (in particular a printed circuit board, PCB, which is a diode carrier), and/or a profile bearing the source carrier (PCB carrier), may project into this groove and preferably is not in optical contact with the first face. The PCB carrier (and/or the preferably metallic bearing profile) serves as a screen.

A minima, the fluoropolymer film may extend only between the coupling edge face and the edge (closest to the guiding edge face) of the light-extracting means. For simplicity, it covers the inner face while optionally being set back from the coupling edge face as described above.

Furthermore, the laminated glazing unit may have the following configuration: the edge face of the guiding glass pane comprises a marginal recess spanning the thickness where the source is housed, or the second substrate is projecting beyond the coupling edge face of the first sheet, creating a lateral cavity of the glazing unit.

The guiding glass pane preferably comprises a peripheral recess (which is local, over a fraction of the length of the first lateral or longitudinal edge face) and/or the second glass substrate projects beyond the guiding edge face and the light source (preferably array of diodes) on a carrier, such as a printed circuit board referred to as a (diode) PCB carrier, in the peripheral recess or the projecting zone, does not project beyond the edge face of the second glass substrate and even beyond the plane of the second face. And preferably the source (PCB) carrier is attached (directly or via a base) to the bonding face in the projecting zone or the peripheral recess and/or in a groove between the first face and the bonding face in particular if the source (diodes) is side-emitting, and/or else attached to the coupling edge face by an optical adhesive or a transparent double-sided adhesive.

In particular for a building application, the second glass substrate may project beyond the guiding edge face by offsetting with the first glass substrate, being of identical size or larger size in order to keep the opposite edge faces aligned (to within 1 mm for example). In particular for a vehicle application (luminous glazed roof), the guiding glass pane comprises a local, peripheral recess.

A PCB carrier which is metallic may be preferred for heat dissipation, or it is attached via the back to a metal base that preferably does not project beyond the guiding edge face and even the plane of the second face. This base may be a strip of L-shaped or even U-shaped cross section.

The edge face of the second substrate may be free or bound to a polymeric encapsulation or else facing a (metal, wood, plastic) mounting profile for the luminous glazing unit, for example of L-shaped or U-shaped cross section over the thickness of the luminous glazing unit.

Alternatively or in addition to the source (PCB) carrier that is used for masking hot spots as mentioned above, the luminous glazing unit according to the invention in the form of a laminated glazing unit with the second lamination interlayer and the second glass substrate, may comprise an element for masking the light source and/or hotspots (in particular via the bonding face, in the vicinity of the injection zone),—in a vehicle application, and/or for masking the attachment of the glazing unit to the body of the vehicle via the second face, it being possible for the masking element to be:

- preferably a masking layer which is a sufficiently opaque enamel, over the periphery of the bonding face and/or of the face opposite the bonding face, and/or of a face added facing the first face and optionally over the periphery of the second face or even a reflective layer over the periphery of the bonding face and/or of the face opposite the bonding face, and/or of a face added facing the first face,
- or, in particular in a vehicle application, a polymeric encapsulation (sufficiently opaque black), on the side of the second face and/or on the side of the face opposite the bonding face and optionally over the periphery of the second face.

This masking element may extend more than the source (PCB) carrier, and be between the bonding face and the second lamination interlayer. This element may correspond to said additional element.

The low-index film may be discontinuous and the light-extracting means are a lacquer or a paint on the first lamination interlayer.

In one configuration, the low-index film (on the lamination interlayer) partially covers the guiding glass pane, thus having a first zone referred to as an optical isolation zone, first optical isolation zone preferably closer to the light source than the extracting means. A zone, referred to as an (extracting) luminous zone, adjacent to and preferably contiguous with the first optical isolation zone comprises the extracting means, in particular formed by a scattering layer. These (in particular local) extracting means are for example:
- directly on the inner face,
- or directly on the interlayer (or a second interlayer on top), first or second (in particular local) surface, for example a printed PCB,
- or directly on the bonding face,
- or a (plastic, etc,) scattering film inserted in particular underneath the bonding face or the opposite face.

The scattering layer may be a paint, in particular a lacquer, or an enamel preferably on the bonding face at least in the luminous zone.

Optionally, the low-index film is discontinuous, thus having a second zone referred to as an optical isolation zone, the extracting luminous zone being between the first and second optical isolation zones, in particular contiguous to the first and second optical isolation zones.

The luminous glazing unit may comprise an electrically controllable system having variable optical properties, in particular having liquid crystals or having a light valve, electrochrome, even thermochrome, underneath the optical isolator or preferably on top of the optical isolator.

In a laminated glazing unit according to the invention, it is possible to have the following system: said first lamination interlayer/low-index film/second lamination interlayer/carrier (plastic film)/first electrode/electrically controllable optical system/second electrode/carrier (plastic film)/third lamination interlayer/second glass substrate. As carrier, a poly(ethylene terephthalate), referred to as PET, may be chosen.

As an electrically controllable optical system, mention may be made of: liquid crystals, light valve (SPD), electrochrome, or even thermochrome.

Mention may be made of the liquid crystals described in applications EP 964 288, EP 0 823 653 A1, EP 0 825 478 A1, EP 0 964 288 A3 and EP 1 405 131.

The luminous zone(s) may:
- have a decorative, ambient light function (made of one or more features of different shape and/or color, that are joined together or spaced apart), and/or

- provide architectural lighting,
- provide directional lighting (light concentrator extracting means),
- have one or more signaling features and/or commercially oriented features (logo, etc.) of different shape and/or color, that are joined together or spaced apart.

To extract the light, scattering means are used, these means being formed either by a surface treatment of the glass sheet of sandblasting, acid etching or deposition of an enamel or scattering paste type or by a treatment in the bulk of the glass, of laser etching type.

A(n) (intermediate) product corresponding to the luminous glazing unit according to the invention without the light-extracting means may be sold to the end user or client who may themselves produce the light-extracting means, in particular that are erasable or removable, preferably on the second face; for example via a sticker or else a suitable marker pen.

The scattering extracting means are in the form of a surface texturing, in particular of the inner or outer face, or of a scattering layer, in particular an enamel, a paint, an ink (white preferably or other depending on the zones or on the requirements) or else a (removable) scattering sticker.

The extracting means may concentrate the light (directed light emission) for example:
- reflecting means facing extracting means in order to reflect the extracted rays in a given direction, as described in document FR 2 989 176,
- lens as described in document WO 2005/018 283,
- first glass substrate beveled in particular with an acute angle of less than or equal to 45°, described in document FR 2 987 043 (in particular example in FIG. 2) with a reflector which is a reflective and/or polished surface.

The extracting means (all or some thereof) may be on the outer face opposite the inner face rather than underneath the first interlayer or underneath the low-index film occupying substantially the entire inner face.

According to one characteristic, a scattering layer is white, in particular a paint or an enamel, preferably having a lightness L* of at least 50, and is part of or forms the extracting means on the opposite side from the lamination interlayer or on the side of the first lamination interlayer. The color is defined in a known way by the L*, a* and b* parameters and is measured by a spectrocolorimeter.

In the event of a scattering layer on the lamination side, the first interlayer may cover the scattering layer or even a frosted zone.

The low-index film may be arranged (cut) solely adjacent to and even contiguous with the scattering layer (on either side).

The scattering layer, which is on the lamination side, preferably has a diffuse reflection factor of greater than or equal to 50%, or even greater than or equal to 80%.

The scattering layer, which is on the side opposite the lamination, preferably has a diffuse transmission factor of greater than or equal to 50%, or even greater than or equal to 80%.

The scattering layer may be an assembly of scattering features referred to as a scattering array, very particularly for a luminous zone of large size that it is desired to make as uniform as possible. This scattering array may be formed from scattering features for example having a (mean) width of 0.2 mm to 5 mm. In order to form this array, it is possible to texture a layer.

In the luminous zone(s) (on the side opposite the face with extracting means such as the enamel and/or on the side of the face with extracting means such as the enamel), the lighting may be of Lambertian type and not directional type, along a propagation axis of the light. Thus, the luminance has the advantage of being substantially the same regardless of the angle of observation.

Preferably, the guiding glass pane coated with extracting means, especially enamel, has a light transmission of less than 45%, or less than 40% or even less than 35%.

The, especially enamel, extracting means for example extend over the entirety of one face of the guiding glass pane or substrate, discontinuously or so as to form geometric shapes randomly arranged along curved and/or straight lines. The enamel has for example fractal geometry.

According to another characteristic, the extracting means extend discontinuously and bound dark zones, especially features of geometric shapes randomly arranged along curved and/or straight lines, especially of at least centimeter-sized length (largest dimension).

The luminous zone may cover part of the area, thus leaving at least one first dark, i.e. non-luminous, zone, which dark zone is chosen from a transparent zone (clear glass area, etc.) or a decorative zone (opaque and/or colored coating) or even a reflective zone, especially a mirror, for example formed by silvering, covered with a protective paint.

The mirror is for example the SGG Miralite product from SAINT-GOBAIN GLASS, with a paint that protects against oxidation, the silvering of the mirror being positioned:
- on the same face as the extracting means (enamel, paint) or on an opposite face,
- on the side of the lamination.

As a variant, the mirror is based on chromium such as the SGG Mirastar product from SAINT-GOBAIN GLASS, the chromium being:
- on the same face as the extracting means (enamel, paint) or on an opposite face,
- on the side of the lamination or on the outer face or exterior face.

The maximum width, the width corresponding to the smallest surface dimension of this luminous zone (of any possible shape), may preferably be less than 200 nm, or even less than or equal to 100 nm, in particular for leaving a large dark zone area. The width is constant or variable.

The luminous zone may be a peripheral zone, in particular along at least one edge, for example forming at least one band or pattern, whereas the dark zone is more central (and further from the light source).

The, especially enamel, scattering layer may be a continuous surface layer having a width of less than 200 mm, or even less than 100 mm and more preferably still less than or equal to 50 mm, or be discontinuous and formed from an assembly of thin features having a width (minimum dimension of the feature) of less than 200 mm, or even less than 100 mm and more preferably still less than or equal to 50 mm.

The scattering extracting features are for example geometric shapes: rectilinear or curved band, concentric circles, L shapes, etc. The features are identical or different, parallel to each other or not and may be separated by an identical distance or not.

In one preferred embodiment, the scattering layer (all or some of the extracting means) consists of agglomerated particles in a binder, said particles having a mean diameter of between 0.3 and 2 microns, said binder being in a proportion of between 10% and 40% by volume and the particles forming aggregates the size of which is between 0.5 and 5 microns. This preferred scattering layer is particularly described in patent application WO 01/90787.

The particles may be chosen from semi-transparent particles and preferably from mineral particles such as oxides, nitrides, and carbides. The particles will preferably be chosen from the oxides of silica, of alumina, of zirconia, of titanium, of cerium, or from a mixture of at least two of these oxides. To extract the light, scattering means are used, these means being formed either by a surface treatment of the glass sheet of sandblasting, acid etching or deposition of an enamel or scattering paste type, or by a treatment in the bulk of the glass, of laser etching type.

The scattering layer (all or some of the extracting means) may be composed of elements containing particles and a binder, the binder making it possible to agglomerate the particles together. The particles may be metallic or metal oxides, the size of the particles may be between 50 nm and 1 μm, preferably the binder may be mineral in order to give heat resistance.

The particles may be chosen from semi-transparent particles and preferably from mineral particles such as oxides, nitrides, and carbides. The particles will preferably be chosen from the oxides of silica, of alumina, of zirconia, of titanium, of cerium, or from a mixture of at least two of these oxides.

For example, a scattering mineral layer (all or some of the extracting means) of around 10 μm is chosen.

Advantageously, a luminous zone is an enamel flat tint (therefore a solid zone as opposed to an array of discrete features of millimeter-sized dots) in particular having an at least centimeter-sized length (largest dimension).

According to one characteristic, the extracting enamel has the following composition:

between 20% and 60% by weight of $SiO_2$,

10% to 45% by weight of especially micron-sized refractory pigments, especially of $TiO_2$; and preferably no more than 20% by weight of alumina and/or zinc oxide.

The $TiO_2$ pigments make the enamel sufficiently opaque (that the enamel can be seen in the off-state) and lower the $T_L$. Examples of extracting enamel compositions include the enamel called Ferro 194011 sold by FERRO, the enamel of reference AF5000 sold by JM and the enamel of reference VV30-244-1 sold by Pemco, which are very white, with a brightness higher than 20, and have a low light transmission—lower than 40%.

It may be desirable for the light only to be seen from the outer face side. In order to do this, it is possible:

to use a reflector or an opaque element on the extracting means on the lamination side (scattering layer in particular), to use a reflector or an opaque element on the lamination side facing the extracting means on the outer face, to sufficiently increase the thickness of the scattering layer (lamination side).

It is possible to use a scattering enamel/masking enamel system according to the one-way vision process with discrete features made of enamel described in patent WO 2012/172 269 or else EP 1 549 498.

By way of a light source an extracting optical fiber having an emitting side face (coupled to a primary light source that is typically a diode) may be chosen. The optical fiber called 3M™ Precision Lighting Elements from 3M is for example used.

Diodes are preferred. The diodes may be (pre)encapsulated, i.e. comprising a semiconductor chip and a package (for example made of an epoxy resin or of PMMA) encapsulating the chip and having multiple functions: scattering or focusing element, wavelength conversion. The package is shared or individual.

The diodes may preferably be simple semiconductor chips, for example having a size of the order of about a hundred µm or mm. Their width is preferably less than the thickness of the first glass substrate especially if not laminated on the second face side.

The diodes may optionally comprise a (temporary or permanent) protective package for protecting the chip during handling or to improve the compatibility between the materials of the chip and other materials.

The diode may especially be chosen from at least one of the following light-emitting diodes:

a side-emitting diode, i.e. emitting parallel to (the faces of) the electrical contacts, with an emitting face located to the side relative to the carrier; and a diode the main emission direction of which is perpendicular or oblique relative to the emitting face of the chip.

The emission diagram of a light source may be Lambertian.

Preferably, the distance between the chips and the first sheet is less than or equal to 2 mm and even less than or equal to 1 mm.

Advantageously, the diodes are arranged so as to inject light through the edge face of the guiding glass pane along two parallel opposite sides.

The light extracted by the extracting feature may flash, change color by virtue of means for controlling the light source, for example an assembly of diodes emitting white light or else red, green, blue and preferably also white light.

The light-extracting means may be an enamel, a lacquer or a paint on the first main surface or underneath the first lamination interlayer.

The light-extracting means may be in the form of a texturing of the guiding glass pane on the outer face which is preferably a free surface, or of a scattering layer, in particular an enamel, a lacquer or a paint.

Most of the LEDs on the market have a Lambertian emission. The stricter the angular acceptance constraints, the greater the necessity for the addition of a collimating optic to the LEDs (costly, problem of injection and mixing with RGB LEDs, etc.) in the absence of the use of a low-index film. But these injection problems are even more critical when the guiding glass pane is thin (typically when the thickness of the first glass substrate is <5 mm).

The guiding glass pane used may be any type of flat (or optionally curved) glass (the glass, when it is a question of coating curved surfaces, being bent by bending processes known to those skilled in the art). It may be a question of monolithic glass panes, i.e. panes composed of a single sheet of mineral glass, which may be produced by the float process, allowing a perfectly flat and smooth sheet to be obtained, or by drawing or rolling processes.

By way of examples of glazing materials, mention may be made of float glass, optionally chemically or thermally hardened or tempered, having a conventional soda-lime composition, an aluminum borosilicate, sodium borosilicate or any other composition.

The glass of the guiding glass pane may be clear or extra-clear, containing a very low content of iron oxide(s). It may for example be a question of the glass panes sold in the "DIAMANT" range by SAINT-GOBAIN GLASS.

The substrate of the guiding glass pane may be a glazing unit made of soda-lime-silica glass, in particular that is extra-clear, and may have:

a transmission of the light radiation of greater than or equal to 91%, or greater than or equal to 92% or even 93% or 94% at 550 nm or preferably in the entire visible range;

and/or a reflection of the light radiation of less than or equal to 7%, or less than or equal to 4% at 550 nm or preferably in the entire visible range.

The optically coupled edge face may be shaped, in particular by (rounded) motor vehicle shaping or straight shaping.

The guiding glass pane may have been given a heat treatment at a temperature of 450° C. or more, preferably of 600° C. or more, and is especially even a tempered glass pane or tempered curved glass pane.

The thickness of the first glass substrate is preferably between 2 and 19 mm, preferably between 4 and 10 mm and more particularly between 5 and 9 mm.

By way of examples, the luminous glazing unit is intended for:

a building glazing unit, such as an illuminating wall panel, an illuminating window, a ceiling light, an illuminating floor or wall tile, an illuminating glazed door, an illuminating partition, an illuminating ceiling, a staircase step, a railing, a balustrade, a counter, a transport vehicle, such as an illuminating side window or an illuminating glazed roof or an illuminating window or a rear window, an illuminating glazed door, in particular for private transportation, such as motor vehicles or trucks, or for public transportation, such as trains, subways, tramways, buses or waterborne or airborne (aircraft) vehicles, road or urban lighting, a glazing unit of street furniture, such as an illuminating glazed part of a bus shelter, balustrade, display case, store window, shelf, greenhouse, a glazing unit for interior furniture, such as an illuminating bathroom wall, an illuminating mirror, an illuminating glazed part of a piece of furniture (preferably single glazing), a glazed part, in particular door, a glass shelf, cover of domestic or professional refrigerated equipment.

The luminous glazing unit (in particular laminated with mineral or organic glass) may be part of a double or triple glazing unit, such as a window of a building or vehicle (train, etc.) or a door of a building or vehicle (train, etc.). It is preferred in this case to leave a transparent zone over most of the luminous glazing unit, in particular a central zone with optional (local) extracting feature(s). It is also preferred to place the luminous glazing unit on the interior side of the building or vehicle.

The luminous glazing unit (in particular laminated with mineral or organic glass) may even be part of a double glazing unit of a door of refrigerated equipment, in particular that is vertical. It is preferred in this case to leave a transparent zone over most of the luminous glazing unit with optional (local) extracting feature(s). The luminous glazing unit may be the outermost glazing of the equipment.

The luminous glazing unit may in particular be a partition, in particular a laminated partition, door (framed or unframed, in particular laminated), window, in particular double or triple glazed window, furniture glazing, ceiling, railing, wall panel, staircase step, mirror incorporating a luminous glazing unit according to the invention.

The partition may be fixed or in the form of sliding panels, for example mounted on rails. The door may be an internal or external door or else a shower door.

For lighting of a partition, shelf, store window or premises of a company, the geometric shape of the combination of the enamel and of the transparent glazed surface will advantageously correspond to the company's logo.

The luminous glazing unit according to the invention may be intended to equip any vehicle:

preferably mobile or fixed roof of a land-based vehicle, in particular motor vehicle, utility vehicle, truck or train, with a first optionally rounded sheet, in particular a laminated glazing unit, side window of a land-based vehicle, in particular motor vehicle, utility vehicle, truck or train, in particular with the functional element that is a part for holding a window regulator system or with the hood trim, windshield of a land-based vehicle, in particular motor vehicle, utility vehicle, truck or train, in particular with the luminous zone(s) (forming a "HUD" signal for example), in the enamel border or in proximity thereto, or rear window in particular in the enamel border or in proximity thereto, porthole or windshield of an airborne vehicle, windowpanes or roof of a waterborne vehicle, boat, submarine, glazing unit in a train or bus, in particular fitted as a double or triple glazing unit.

In a vehicle, the extraction/conversion of the radiation (and also the type and/or the position and/or the number of the diodes) is adjusted for:

ambient lighting, light for reading, in particular visible inside the vehicle, a luminous sign in particular visible outside:
by remote activation: detection of the vehicle in a parking lot or elsewhere, door (un)locking indicator, or
safety signal, for example such as rear brake lights, a substantially uniform lighting over the entire extraction surface (one or more extraction zones, common or separate functions).

The light may be:
continuous and/or intermittent,
monochromatic and/or polychromatic.

Visible inside the vehicle, it may thus have a nighttime lighting function or display function for displaying all kinds of information, of design, logo, alphanumeric sign or other signage type.

A single extraction face (preferably inside the vehicle) may be produced.

It is preferred that the light source, in particular the array of light-emitting diodes, be entirely facing (and better still having a thickness less than or equal to the thickness of the guiding glass pane) and even centered on the edge face of the guiding glass pane. However, the light source (the diodes) may at a push be at least partially also facing the lamination interlayer. Details and advantageous features of the invention will now become clear from the following nonlimiting examples, and by way of FIGS. 1 to 10 which are schematic and partial cross-sectional views of luminous glazing units with an optical isolator in several embodiments of the invention.

The elements are not to scale,

BRIEF DESCRIPTION OF THE DRAWINGS

FIG. 1 shows a partial cross-sectional view of a luminous glazing unit in accordance with an embodiment of the invention;

FIG. 2 shows a partial cross-sectional view of a luminous glazing unit with an optical isolator according to a second embodiment of the invention;

FIG. 3 shows a partial cross-sectional view of a luminous glazing unit with an optical isolator according to a third embodiment of the invention;

FIG. 4 shows a partial cross-sectional view of a luminous glazing unit with an optical isolator according to a fourth embodiment of the invention;

FIG. 5 shows a partial cross-sectional view of a luminous glazing unit with an optical isolator according to a fifth embodiment of the invention;

FIG. 6 shows a partial cross-sectional view of a luminous glazing unit with an optical isolator according to a sixth embodiment of the invention;

FIG. 7 shows a partial cross-sectional view of a luminous glazing unit with an optical isolator according to a seventh embodiment of the invention;

FIG. 8 shows a partial cross-sectional view of a luminous glazing unit with an optical isolator according to an eighth embodiment of the invention;

FIG. 9 shows a partial cross-sectional view of a luminous glazing unit with an optical isolator according to a ninth embodiment of the invention, and FIG. 10 shows a partial cross-sectional view of a luminous glazing unit with an optical isolator according to a tenth embodiment of the invention.

EXAMPLES OF LUMINOUS GLAZING UNITS

FIG. 1 shows a partial cross-sectional view of a luminous glazing unit 100 with an optical isolator in a first embodiment comprising:

a first glass substrate 1, referred to as guiding glass pane, which is glazing here of rectangular shape that is flat or as a variant curved, made of clear or extra-clear soda-lime-silica glass (preferably of around 6 mm for example for a building or of at most 3 mm for a motor vehicle), having a refractive index n1 of around 1.5 at 550 nm, a $T_L$ of at least 90%, with a first main face 11, referred to as an inner face, and a second main face 12, referred to as an outer face, and a first edge face 13, a light source 4, here an array of light-emitting diodes 4 on a printed circuit board, referred to as a PCB carrier 41, said source being optically coupled to the edge face 13, referred to as the guiding edge face of the guiding glass pane, the guiding glass pane guiding the light emitted by the diodes that are preferably at a distance (spaced apart or bonded) at most 2 mm away from the guiding edge face, diodes preferably being centered on the edge face and having a width of less than the thickness of the glass pane 1, light-extracting means 6 associated with the guiding glass pane, here on the inner face 11, which are a, preferably white, scattering layer preferably having a lightness L* of at least 50, preferably a scattering enamel, or as a variant a frosting of the second face or else an optical concentrator, extracting means here made up of several scattering features forming a plurality of luminous zones (or one uniform luminous zone if they are close enough) or as a variant a solid, for example single and central, luminous zone.

The inner face 11 in addition successively comprises:

a first lamination interlayer 7 made of thermoplastic material, preferably EVA or even PVB or PU, or else PVB surmounted by an EVA that is generally of sub-millimeter size, transparent for example clear, having an inner surface 71 in adhesive contact with the inner face 11 and an outer surface 72, a low-index film 2, preferably ETFE or even FEP and with a thickness of at least 50 μm having main faces 21, 22 treated by corona treatment, in adhesive contact with the EVA 7 preferably (EVA alone or EVA on PVB), a second lamination interlayer 7' made of thermoplastic material, preferably EVA or even PVB or PU, or else PVB surmounted by an EVA that is generally of sub-millimeter size, transparent for example clear, identical to the first lamination interlayer, preferably EVA in adhesive contact with the low-index film (EVA alone or EVA on PVB), a second glass substrate 1', made of mineral glass, for example identical to the guiding glass pane with a bonding main face 11' on the second lamination interlayer side 7' and an opposite face 12'.

The face opposite the bonding face 11' directly (or via an adhesion primer) bears a decorative and/or masking first coating 5, for example a continuous layer of paint and preferably a lacquer, that is colored (white and black included) preferably having a color different from the extracting means 6, or arranged as separate or continuous colored discrete features of one color or of different colors, for example produced by masking or by screen printing. As a variant, the bonding face 11' bears this decoration. The guiding glass pane 1 may be tempered or curved and tempered, as well as the second glass substrate.

The extracting enamel 6 for example has the following composition:

between 20% and 60% by weight of $SiO_2$,

10% to 45% by weight of especially micron-sized refractory pigments, including $TiO_2$, and preferably no more than 20% by weight of alumina and/or zinc oxide.

The $TiO_2$ pigments make the enamel sufficiently opaque (that the enamel can be seen in the off-state) and lower the $T_L$.

Examples of enamel compositions include the enamel called Ferro 194011 sold by FERRO, the enamel of reference AF5000 sold by JM and the enamel of reference VV30-244-1 sold by Pemco.

The enamel here is screen printed, or as a variant printed. The extracting means may form a plurality of luminous features, for example as wide peripheral bands and/or more discrete, in particular geometric features. The luminous features form a decoration, signage, logo or trademark. The lighting may be continuous or flashing and/or of variable color.

Other diodes may be added to the edge face opposite the edge face 13 (not shown here) especially in the case of a glazing unit of large size and/or with a plurality of separate centimeter-sized features (with a large extraction surface).

In order to see, through the guiding glass pane, a portion of the continuous background of lacquer (or enamel or other paint), it may be desirable for the luminous zone not to be distributed substantially over the entire glazing unit (to thus prevent extraction over the entire inner face bearing the extracting means).

The face 12' opposite the bonding face 11' may be a free surface of the luminous glazing unit, which is visible and even accessible (touchable).

After installation of the luminous glazing unit, this free surface may be facing a glazed side of a building (wall, partition, ceiling, roof) or even of a vehicle.

The luminous glazing unit 100 forms for example in order to form a partition, a ceiling, a floor, a decorative wall panel.

The second substrate 1' coated with lacquer 5 may be the product Planilaque Evolution or Décolaque from the Applicant, with a large range of (hot, cold metalized) available tints. A paint formulation may be deposited according to the curtain-coating method. The solvent is xylene or as a variant water. After it has been dried, the lacquer for example contains the following ingredients:

a binder in the form of a polyurethane resin obtained by crosslinking, with a non-aromatic isocyanate, of hydroxylated acrylic resins resulting from the polymerization of an acrylic styrene; and mineral materials (pigments and fillers) in an amount of 55% by weight.

It is even possible to insert an electrically controllable system having variable optical properties, namely the following sequence, onto the low-index film: second PVB or EVA or PVB+EVA/first transparent electrode carrier such as PET/first transparent electrode in particular ITO or silver multilayer/layer of liquid crystals/second transparent electrode in particular ITO or silver multilayer/second transparent electrode carrier such as PET/third PVB or EVA or PVB+EVA. In the off state, the system is opaque and in the on state the system is transparent and reveals the first coating 5 made of decorative lacquer.

FIG. 2 shows a partial cross-sectional view of a luminous glazing unit 200 with an optical isolator in a second embodiment.

Only differences relative to the first embodiment are described. The luminous glazing unit 200 differs as follows.

The face 12' opposite the bonding face 11' comprises a peripheral opaque enamel 5' for example a masking (black, dark) or decorative enamel.

The extracting means 6 form a single luminous zone, for example a band.

As a variant, this enamel is on the bonding face or the second interlayer is printed with a masking layer.

FIG. 3 shows a partial cross-sectional view of a luminous glazing unit 300 with an optical isolator in a third embodiment.

Only differences relative to the first embodiment are described. The luminous glazing unit 300 differs as follows.

The low-index film 2 is discontinuous (forming first and second optical isolation zones 24 and 25 that are separated by a discontinuity 23, which here is central), leaving a zone (which here is central) where the first lamination interlayer 7 is directly in contact with the second lamination interlayer 7', which is then preferably clear or extra-clear. The discontinuity 23 may be surrounded by the optical isolator 7 (as a closed feature).

It is possible to have a plurality of discontinuities to order. During the manufacture, it is possible to add a thickness of lamination interlayer material in the discontinuity (in addition to sheet(s) for the first interlayer and sheet(s) for the second layer) in order to facilitate the formation of the solid lamination zone.

The extracting means 6 are formed by the paint or lacquer 6, chosen as white, preferably on the bonding face 11' (or alternatively a white enamel), or even the opposite face. Mention may be made by way of example of the extra-white paint of the Planilaque Evolution product from the Applicant, with $TiO_2$ being the predominant pigment. The thickness is typically between 40 and 60 μm.

Alternatively, on the bonding face 11', the lacquer is white (such as the Planilaque Evolution extra-white product) in the zone facing the discontinuity. Furthermore, one or more zones of colors, for example bright colors, may exist.

Alternatively, one face of the first or second lamination interlayer 7 or 7' comprises a scattering layer, for example is a PVB printed, preferably locally, at least in this zone, which here is central.

FIG. 4 shows a partial cross-sectional view of a luminous glazing unit 400 with an optical isolator in a fourth embodiment.

Only differences relative to the second embodiment are described. The luminous glazing unit 400 differs as follows.

The second substrate 1' comprises, on its face 12' opposite the bonding face 11', a tinted element 51, for example a plastic film such as a tinted PET bonded by an optical adhesive or by a lamination interlayer (PVB, etc.), in particular that is clear or extra-clear.

The extracting means 6 are moved to the second (outer) face side 12. These may be extracting means that are removable or erasable such as a sticker or an ink. Of course, it is possible to combine permanent and temporary extracting means.

FIG. 5 shows a partial cross-sectional view of a luminous glazing unit 500 with an optical isolator in a fifth embodiment.

Only differences relative to the first embodiment are described. The luminous glazing unit 500 differs as follows.

As a replacement for (or as a variant in addition to) the decorative paint 5, an electrically controllable system having variable optical properties 52, here having liquid crystals, is inserted between the inner face 11 and the bonding face 11', namely the following sequence:

the first lamination interlayer 7 (EVA or even PVB or PVB+EVA)/the low-index film 2/second lamination interlayer 7" (EVA or even PVB or PVB+EVA)/a first transparent electrode carrier 81 such as PET/first transparent electrode 82 in particular ITO (indium tin oxide) or silver multilayer/layer based on liquid crystals 83/second transparent electrode 84 in particular ITO or silver multilayer/second transparent electrode carrier 85 such as PET/third interlayer PVB or EVA 7'.

In the off state, the system is opaque and in the on state the system is transparent. The second glass pane 1' is for example tinted or identical to the glass panel.

The extracting means (not represented) are for example analogous, a scattering layer, such as a white enamel, on the inner face 11 or as a variant on the outer face 12.

FIG. 6 shows a partial cross-sectional view of a luminous glazing unit 600 with an optical isolator in a sixth embodiment.

Only differences relative to the second embodiment are described. The luminous glazing unit 600 differs as follows.

The decorative and/or masking first coating is replaced by a silvering-based mirror layer 50 with a conventional protective overlay (not shown) or a chromium-based two-way mirror. An illuminating mirror is therefore formed. Preferably, the mirror is visible at least in the central zone and the luminous zone(s) are peripheral (one or two solid bands or discontinuous bands based on discrete features, etc.). The extracting means 6 are for example a scattering layer on inner face 11.

It is possible to add diodes to the opposite edge face (not shown).

FIG. 7 shows a partial cross-sectional view of a luminous glazing unit 700 with an optical isolator in a seventh embodiment.

Only differences relative to the second embodiment are described. The luminous glazing unit 700 differs as follows.

The second glass substrate is made of organic glass, for example a tinted plastic film such as a tinted PET 53 preferably on the face opposite the free bonding face. For example, a cupboard door is thus formed.

As a variant, the first glass substrate 1 is organic, for example PC or PMMA.

FIG. 8 shows a partial cross-sectional view of a luminous glazing unit 800 with an optical isolator in an eighth embodiment.

Only differences relative to the third embodiment are described. The luminous glazing unit 800 differs as follows.

The second glass substrate is made of organic glass, for example a scattering film 6 that forms the extracting means in the discontinuous zone 23.

FIG. 9 shows a partial cross-sectional view of a luminous glazing unit 900 with an optical isolator in a ninth embodiment.

Only differences relative to the second embodiment are described. The luminous glazing unit 900 differs as follows.

This luminous glazing unit 900 is used for example as a motor vehicle roof. The guiding glass pane 1 is approximately 2 mm like the second (tinted) glass pane 1'.

The luminous glazing unit 900 has, at the periphery, a polymeric encapsulation made of PU 90, which is black or gray, of double-sided type (flush with face 12' opposite the bonding face 11') preferably on an adhesion primer or as a variant a pre-fitted seal that is preferably flush also. The encapsulation may also be single-sided, therefore not extending to the second face 12.

The space between the emitting face and the coupling edge face 13 (which is rounded, for motor vehicle type shaping) is filled with optical adhesive 9'.

The glass pane 1' is tinted and preferably also the second interlayer 7'.

The guiding glass pane 1 has a local longitudinal recess in the coupling edge face 13 in order to house the diodes 4 which have an emitting face located to the side. Adhesive 9' on the rear face of the PCB 41 is used to attach the PCB+diodes assembly to the bonding face 11'. The PCB, for example which is opaque, extends laterally in the direction of the lamination interlayer 7 and is used for masking the hot spots. It extends into a groove between the bonding face and the first face by a setting back of the first and second lamination interlayers, each preferably PVB+EVA, and of the low-index film.

The PCB 41 is not in optical contact with the inner face 12 since there is an air gap. The PCB, here a strip, may be metallic for heat dissipation or may be on a metal base.

The PVB and/or EVA of the second interlayer 7' is preferably tinted also.

An opaque coating such as an enamel 5' is at the periphery of the bonding face 12' that extends between the bonding face and the second interlayer 7' also to promote the masking of the stray light that escapes. It may also be on the side of the face opposite the bonding face.

The scattering layer for the extraction is on the outer face 12. The adhesive at the back and/or the adhesive with the coupling edge face 13 may be removed.

As a variant, the extracting means 6 form an optical concentrator, for a reading light for example.

FIG. 10 shows a partial cross-sectional view of a luminous glazing unit 1000 with an optical isolator in a tenth embodiment.

Only differences relative to the ninth embodiment are described. The luminous glazing unit 1000 differs as follows.

The application here is in buildings, for example as a partition. The edge faces of the glazings 1, 1' are straight, the glazings 1, 1' are thicker, for example of 4 or 6 mm approximately. The scattering layer for the extraction is on the inner face and not the outer face 12. The polymeric encapsulation is eliminated (optional)

As a variant, the layer 5' is eliminated. It is possible to use a (metallic, plastic, wood, etc.) mounting profile for the luminous glazing unit, for example of L-shaped or U-shaped cross section projecting over the faces 12' and 12 without being in optical contact preferably with the face 12. This mounting profile may also be used to mask the hot spots on the outer face side and/or on the side of the face opposite the bonding face.

As a variant, the face 12' opposite the bonding face 11' is for example completely frosted 120 or partially frosted, such as the Satinovo glass from the Applicant.

Instead of making a local recess in the guiding glass pane 1, it is possible to move the second glass pane in order to make it project and even to select a smaller first glass pane in order to avoid an offsetting of the edge faces opposite the side of the optical coupling.

The emitting face is spaced preferably at most 1 mm away from the coupling edge face (without optical adhesive).

As a variant, top-emitting diodes are used, the PCB carrier is then opposite the coupling edge face and for example bonded by an optical adhesive or a transparent double-sided adhesive or else use is made of a preferably metallic U-shaped or L-shaped diode attachment profile (not projecting beyond the edge face of the second glazing 1' preferably) with a base at the rear of the PCB carrier and one flange attached to the bonding face in the projecting zone and optionally another flange on the opposite side. The flange(s) may be used to mask the hot spots.

The invention claimed is:

1. A luminous glazing unit comprising:
    a first glass substrate, made of mineral glass having a refractive index n1 of less than 1.6 at 550 nm, with first and second main faces and an edge face, and in optical contact with the first main face:
        an additional element which is tinted, scattering, or reflective,
        an optical isolator inserted between the first glass substrate and the additional element, the optical isolator having a refractive index of less than n1 at 550 nm,
    a light source, optically coupled to the first glass substrate, the first glass substrate configured to guide the light emitted by the light source,
    a light-extracting device associated with the first glass substrate,
    wherein the optical isolator comprises a low-index film, made of fluoropolymer-based material which:
        has a refractive index n2 at 550 nm such that n1-n2 is at least 0.08,
        has a thickness e2 of at least 600 nm,
        is in optical contact with the first main face by a first lamination interlayer, based on a thermoplastic material which has a refractive index n3 at 550 nm such that n3-n1, as an absolute value, is less than 0.05.

2. The luminous glazing unit as claimed in claim 1, wherein the low-index film has a first main surface in contact with the first lamination interlayer and a second main surface opposite the first main surface, the first main surface being treated by an adhesion-promoting treatment.

3. The luminous glazing unit as claimed in claim 1, wherein the fluoropolymer is ETFE or FEP.

4. The luminous glazing unit as claimed in claim 1, wherein the first lamination interlayer comprises a sheet of EVA.

5. The luminous glazing unit as claimed in claim 1, wherein the low-index film has a first main surface in contact with the first lamination interlayer and a second main surface opposite the first main surface, wherein the glazing unit additionally comprises:
    a second polymeric lamination interlayer in adhesive contact with the second main surface,
    a second glass substrate, made of mineral or organic glass bonded to the second lamination interlayer via a bonding face,
    the second interlayer and/or the second glass substrate forming the additional element or bearing the additional element.

6. The luminous glazing unit as claimed in claim 5, wherein the first lamination interlayer comprises a first sheet of PVB in adhesive contact with the first main face and with a first sheet of EVA which is in adhesive contact with the low-index film and wherein the second lamination interlayer comprises a second sheet of PVB in adhesive contact with the bonding face and with a second sheet of EVA which is in adhesive contact with the low-index film.

7. The luminous glazing unit as claimed in claim 5, wherein the second lamination interlayer is tinted and/or is laminated with the second glass substrate that is tinted and/or bears a tinted film oriented on a side of the lamination interlayer or main face opposite the lamination.

8. The luminous glazing unit as claimed in claim 5, wherein the first lamination interlayer, the low-index film, and the second interlayer are set back from the edge face of the first glass substrate, leaving a groove between the first main face and the bonding face of the second glass substrate, and a carrier for the light source projects into the groove without being in optical contact with the first face.

9. The luminous glazing unit as claimed in claim 5, wherein the second glass substrate projects beyond the edge face or the first glass substrate comprises a peripheral recess and the light source on a source carrier is in the peripheral recess or a projecting zone not projecting beyond an edge face of the second glass substrate and even beyond a plane of the second face, and the source carrier is attached to the bonding face in the projecting zone or the peripheral recess and/or in a groove between the first face and the bonding face.

10. The luminous glazing unit as claimed in claim 5, wherein the bonding face of the second substrate is coated with a decorative and/or masking layer, which is peripheral and on a side of the optical coupling, or distributed and substantially covering the bonding face or wherein a face opposite the bonding face of the second substrate is coated with a decorative and/or masking layer, which is peripheral and on the side of the optical coupling, or distributed and substantially covering the face opposite the bonding face.

11. A luminous glazing unit comprising:
  a first glass substrate, made of an organic glass having a refractive index n1 of less than 1.6 at 550 nm, with first and second main faces and an edge face, and in optical contact with the first main face:
    an additional element which is tinted, scattering, or reflective,
    an optical isolator inserted between the first glass substrate and the additional element, the optical isolator having a refractive index of less than n1 at 550 nm,
  a light source, optically coupled to the first glass substrate, the first glass substrate configured to guide the light emitted by the light source,
  a light-extracting device associated with the first glass substrate,
wherein the optical isolator comprises a low-index film, made of fluoropolymer-based material which:
  has a refractive index n2 at 550 nm such that n1-n2 is at least 0.08,
  has a thickness e2 of at least 600 nm,
  is in optical contact with the first main face by a first lamination interlayer, based on a thermoplastic material which has a refractive index n3 at 550 nm such that n3-n1, as an absolute value, is less than 0.05
wherein the low-index film has a first main surface in contact with the first lamination interlayer and a second main surface opposite the first main surface, the luminous glazing unit additionally comprises:
  a second polymeric lamination interlayer in adhesive contact with the second main surface,
  a second glass substrate bonded to the second lamination interlayer via a bonding face, the second interlayer and/or the second glass substrate forming the additional element or bearing the additional element.

12. The luminous glazing unit as claimed in claim 1, wherein the low-index film partially covers the first glass substrate, thus having a first optical isolation zone, the first optical isolation zone closer to the light source than the extracting device and wherein a luminous zone, adjacent to the first optical isolation zone, comprises a light extracting device.

13. The luminous glazing unit as claimed in claim 1, comprising an electrically controllable system having variable optical properties.

14. The luminous glazing unit as claimed in claim 1, wherein a scattering layer that is white is part of or forms the extracting device on the opposite side from the first lamination interlayer or on the side of the first lamination interlayer in a zone free of the optical isolator.

15. The luminous glazing unit as claimed in claim 1, wherein the extracting device is a scattering device, in the form of a surface texturing, or of a scattering layer or a scattering sticker and/or form a light concentrator.

16. The luminous glazing unit as claimed in claim 1, wherein the light source is an array of light-emitting diodes on a printed circuit board and coupled to the edge face of the first glass substrate.

17. The luminous glazing unit as claimed in claim 1, wherein the luminous glazing unit forms a luminous glazing unit for a vehicle.

18. The luminous glazing unit as claimed in claim 1, wherein the luminous glazing unit forms a luminous glazing unit for a building, for street furniture or for interior furniture, or for domestic or professional refrigerated equipment.

19. The luminous glazing unit as claimed in claim 2, wherein the adhesion-promoting treatment is a corona treatment.

20. The luminous glazing unit as claimed in claim 17, wherein the luminous glazing unit is a luminous laminated glazed roof.

21. The luminous glazing unit as claimed in claim 8, wherein the carrier is a printed circuit board.

22. The luminous glazing unit as claimed in claim 13, wherein the electrically controllable system includes liquid crystals or a light valve, or electrochrome or thermochrome.

* * * * *